United States Patent
Kawahara et al.

(10) Patent No.: US 6,251,959 B1
(45) Date of Patent: Jun. 26, 2001

(54) CHITIN DERIVATIVES HAVING CARBOXYLATED LOWER ALKYL GROUPS AS HYDROPHILIC SUBSTITUENTS AND HYDROPHOBIC SUBSTITUENTS, AND MICELLAR AQUEOUS COMPOSITION THEREOF

(75) Inventors: Hiroyuki Kawahara; Shuji Jinno; Yuji Okita, all of Tokyo (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 5 days.

(21) Appl. No.: 09/180,373

(22) PCT Filed: May 8, 1997

(86) PCT No.: PCT/JP97/01549

§ 371 Date: Jan. 29, 1999

§ 102(e) Date: Jan. 29, 1999

(87) PCT Pub. No.: WO97/42226

PCT Pub. Date: Nov. 13, 1997

(30) Foreign Application Priority Data

May 9, 1996 (JP) .................................. 8-139634

(51) Int. Cl.[7] .............................. C09K 3/00; C08B 37/08
(52) U.S. Cl. .................................. 516/67; 536/20
(58) Field of Search ................... 536/20; 516/67

(56) References Cited

U.S. PATENT DOCUMENTS 3,953,608 * 4/1976 Vanlerberghe et al. ............. 424/361
4,304,905    12/1981 Koshugi ............................... 536/20

(List continued on next page.)

FOREIGN PATENT DOCUMENTS 0 699 433    3/1996 (EP) .

OTHER PUBLICATIONS

Abstract of JP7136205 dated Dec. 5, 1995, Japan.

(List continued on next page.)

*Primary Examiner*—Lyle A. Alexander
*Assistant Examiner*—Monique T. Cole
(74) *Attorney, Agent, or Firm*—Armstrong, Westerman, Hattori, McLeland & Naughton, LLP

(57) ABSTRACT

A chitin derivative having a carboxyalkyl group having a polysaccharide backbone, said carboxyalkyl group being represented by the following formula (1):

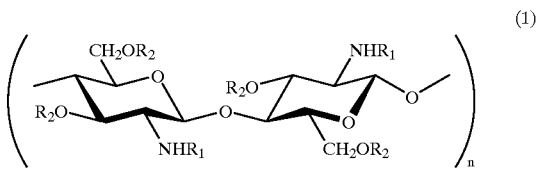

wherein n=1 or above, $R_1$ stands for an alkyl group represented by $(CH_2)_p CH_3$ with p=1 to 20, an alkylcarbonyl group represented by $CO(CH_2)_q CH_3$ with q=1 to 19, a carboxyalkyl group represented by $(CH_2)_r COOH$ with r=1 to 5 or a salt thereof, H, or $COCH_3$, and $R_2$ stands for a carboxyalkyl group represented by $(CH_2)_s COOH$ with s=1 to 5 or a salt thereof or H; the degree of deacetylation of the N-acetyl group in chitin is 70 to 100%, wherein 100% deacetylation means one deacetylated N-acetyl group per one monosaccharide unit; 10 to 100% of $R_1$ are selected from alkyl groups $(CH_2)_p CH_3$ and alkylcarbonyl groups $CO(CH_2)_q CH_3$, wherein 100% means one alkyl group $(CH_2)_p CH_3$ or alkylcarbonyl group $CO(CH_2)_q CH_3$ per one monosaccharide unit; not more than 10% of $R_1$ are carboxyalkyl groups $(CH_2)_r COOH$; 50 to 200% of $R_2$ are carboxyalkyl groups $(CH_2)_s COOH$, wherein 200% means two carboxyalkyl groups $(CH_2)_s COOH$ per one monosaccharide unit; and the molecular weight of the polysaccharide backbone is 150,000 or less.

4 Claims, 2 Drawing Sheets

Relation between number of pressing times and yield

U.S. PATENT DOCUMENTS

| | | | |
|---|---|---|---|
| 4,308,377 | 12/1981 | Koshugi | 536/20 |
| 5,412,072 | 5/1995 | Sakurai et al. | 530/322 |
| 5,449,513 | 9/1995 | Yokoyama et al. | 424/78.08 |
| 5,510,103 | 4/1996 | Yokoyama et al. | 424/78.08 |
| 5,693,751 | 12/1997 | Sakurai et al. | 530/322 |
| 5,962,663 * | 10/1999 | Wachter et al. | 536/20 |

OTHER PUBLICATIONS

Abstract of JP6206832 dated Jul. 26, 1994, Japan.
Abstract of JP6206830 dated Jul. 26, 1994, Japan.
Abstract of JP6206815 dated Jul. 26, 1994, Japan.
Abstract of JP5000955 dated Jan. 8, 1993, Japan.
Abstract of WO9221330 dated Dec. 10, 1992, PCT.
Abstract of JP4149205 dated May 22, 1992, Japan.
Abstract of JP4118037 dated Apr. 20, 1992, Japan.
Abstract of EP397307 dated Nov. 14, 1990, Europe.
Abstract of EP583955 dated Feb. 23, 1994, Europe.

Y. Yamamoto et al., "Chitosan–derived Polymer Surfactants and the Interaction with Lipid Membranes."; vol. 2, No. 2, pp.128–129.

H. Yoshioka et al., "Chitosan–derived Polymer-surfactants and Their Micellar Properties", Biosci. Biotech. Biochem., 59(10), 1991–1904, 1995.

J. Desbrieres, et al.: "Hydrophobic Derivatives of Chitosan: Characterization and Rheological Behaviour", *International Journal of Biological Macromolecules*, 19 (1996) 21–28.

* cited by examiner

Fig.1 Relation between number of pressing times and yield

The value in parentheses represent degree of substitution.

CHITIN DERIVATIVES HAVING CARBOXYLATED LOWER ALKYL GROUPS AS HYDROPHILIC SUBSTITUENTS AND HYDROPHOBIC SUBSTITUENTS, AND MICELLAR AQUEOUS COMPOSITION THEREOF

SPECIFICATION

Chitin derivatives having carboxyalkyl groups as hydrophilic substituents and alkyl groups as hydrophobic substituents, and polymer micellar carriers comprised of these chitin derivatives, and micelle-like aqueous compositions of these chitin derivatives

TECHNICAL FIELDS

This invention relates to chitin derivatives having carboxyalkyl groups as hydrophilic substituents and alkyl groups as hydrophobic substituents, micelle-forming substances and polymer micellar carriers comprised of the said chitin derivatives, and micelle-like aqueous compositions using the said micelle-forming substances and polymer micellar carriers. In more detail, this invention relates to the chitin derivatives having carboxyalkyl groups as hydrophilic substituents and alkyl groups as hydrophobic substituents, which are useful as soil-improving agents, protein aggregating agents, micelle-forming agents, etc. In addition, this invention relates to micelle-forming substances and polymer micellar carriers, which are comprised of the chitin derivatives having carboxyalkyl groups as hydrophilic substituents and alkyl groups as hydrophobic substituents, and micelle-like aqueous compositions comprising the said chitin derivatives.

PRIOR ART

Chitin is a polymer of N-acetylglucosamine (poly β-1,4-N-acetyl glucosamine). In general, chitin is a polysaccharide comprising crustacean shells, squid pens and so on. For instance, in the processing of the crab, a lot of shells are produced as a byproduct and chitin contents of the shell is about 15% of the shell weight. Therefore, profitable utilization of chitin has been desired. Chitin is a biodegradable polymer and is very compatible to the living body, so chitin is a noteworthy material as the sutures and a wound-covering agent in the field of surgery, and also is remarkable as a disintegrable or degradable material by microorganisms. Chitin and chitosan are dietary fibers when ingested in the intestine and they are safe for a human. The average molecular weight of those generally used in food is 400,000 to 2,000,000 or more.

The molecular weight of chitin is adjusted according to the purpose of use. In general, strong acidic reagents are most in use to prepare lower molecular weight chitin. The example as follow: the crab chitin which average molecular weight is about four hundred thousands is warmed with 5–10% hydrochloric acid and washed with water and neutralized. Then that is treated with 10–20% sodium hydroxide at 60–90° C. to remove proteins and washed with water, neutralized and dried. Finally, the low molecular weight chitin which have 100,000 or less molecular weight is obtained. Other methods for preparation of the lower molecular weight chitin include the treatment with alkaline solutions, peracids, hydrochloric acid, acetic acid, propionic acid, lactic acid, ascorbic acid and also the enzymatic treatment, such as chitinases (derived from microorganisms and plants) and lysozymes.

Chitin and its derivatives have been used as soil-improving agents, protein aggregating agents and wood-improving agents. And it has been reported that the polymer structure having both hydrophilic and hydrophobic moieties showed desirable property in micelle-formation and that polymer can solubilize the hydrophobic compound. However, there has been no report on the nature of the carboxyalkyl chitin derivatives and the method of production thereof.

In addition it is known that carboxymethylated chitin is more potent in activation of macrophages than the sulfated chitin.

For example, there is a description of the immunological activity of chitin derivatives on pages 195 to 197 of "Application of Chitin and Chitosan" $1^{st}$ Edition $1^{st}$ Print on Feb. 20, 1990, edited by the Japanese Society for Chitin and Chitosan, and published by GIHODO Publishing Co. Various immunologic properties, such as immunity-enhancing activity, anti-tumor activity and infection-resistance-increasing activity, of chitin derivatives were investigated to develop immunity-enhancing agents and/or medical materials from chitin derivatives. It is described that the 70%-deacetylated chitin (DAC-70) had a marked macrophage-activating potency, and the chitin derivative having carboxymethyl group had a comparable potency to that of DAC-70, while the chitin derivative having sulfate group was inactive.

DISCLOSURE OF THE INVENTION

The purpose of this invention is to provide chitin derivatives having carboxyalkyl groups as hydrophilic substituents and alkyl groups as hydrophobic substituents, which are useful for production of soil-improving agents, protein aggregating agents, micelle-forming agents, etc. The purpose of this invention is to provide micelle-forming substances comprised of the said chitin derivatives. The purpose of this invention is to provide polymer micellar carriers comprised of the said chitin derivatives. The purpose of this invention is to provide aqueous micelle-like compositions using the chitin derivatives having carboxyalkyl groups as hydrophilic substituents and alkyl groups as hydrophobic substituents as the polymer micellar carriers.

The gist of this invention is chitin derivatives having carboxyalkyl groups represented by the formula (1) below.

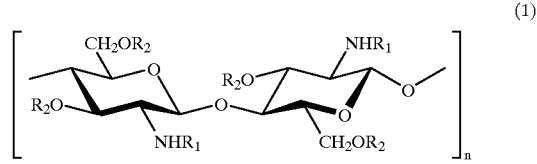

[wherein, $R_1$ stands for either an alkyl group represented by $(CH_2)_nCH_3$ with n=1 to 20, an alkylcarbonyl group represented by $CO(CH_2)_nCH_3$ with n=1 to 19, a carboxyalkyl group represented by $(CH_2)_nCOOH$ with n=1 to 5 or a salt thereof, H, or $COCH_3$, and $R_2$ stands for a carboxyalkyl group represented by $(CH_2)_nCOOH$ with n=1 to 5 or a salt thereof or H; the degree of deacetylation of the N-acetyl group in chitin is 70 to 100% (100% deacetylation means one deacetylated N-acetyl group per one monosaccharide unit); the degree of substitution of $R_1$ with one of the above-mentioned alkyl groups or alkylcarbonyl groups is 10 to 100% (100% substitution means one substituent per one monosaccharide unit); the degree of substitution of R2 with one of the above-mentioned carboxyalkyl groups is 50 to 200% (200% substitution means 2 substituents per one monosaccharide unit); and the molecular weight of the chitin is 500,000 or less] the molecular weight of the chitin in the formula (1) is desirably 100,000 or less.

An additional gist of this invention is a characteristic of the micelle-forming substances comprised of above-mentioned chitin derivatives, or polymer micellar carriers comprised of above-mentioned chitin derivatives. A further additional gist is micelle-like aqueous compositions with the above-mentioned chitin derivatives as polymer micellar carriers. The above-mentioned micelle-like aqueous compositions are the polymer micellar compositions include hydrophobic compounds. The hydrophobic compounds are exemplified by insoluble perfumes, insoluble pigments, or fats and oils.

The materials and the method for production are explained in the following.

As the starting chitin, which can have any crystalline structures, such as α, β, or γ-form, is available to produce a chitin derivative having hydrophilic groups and alkyl group as hydrophobic groups represented by the formula (1). Recrystallized or recomposed chitin, or chitosan (deacetylated chitin) is also available. Molecular weight and degree of deacetylation are not limited. Particle size is not limited, but smaller particle chitin is more easy to disperse in the solvent, the particle size can be chosen according to the purpose. When insufficiently pulverized chitin is used as source, excessive alkaline solution from the alkaline chitin preparation is removed by holding and pressing between filter papers after thawing frozen alkaline chitin, and then the amount corresponding to the weight loss of 55% aqueous sodium hydroxide solution is added to alkaline chitin to easy to swell the chitin.

The chitosan solution used in the present invention is prepared by using chitosan obtained by complete or partial deacetylation of chitin or chitosan contained abundantly in shells of crabs or shrimps and in squid pens.

In the present invention, micelle-like aqueous compositions are liquid-like compositions which solubilize hydrophobic substances and are seen as clear or milky solution by uniformly dispersed hydrophobic substances in the aqueous solvents. Aqueous solvents used herein include distilled water and the like. Edible salt, saccharides, acids, ethyl alcohol, etc. can be added to the solvent as needed.

Solubilization methods of hydrophobic substances are not limited, but to swell chitin derivatives, the solution temperature is desirable to keep at 20 to 100° C. To prepare polymer micelles include hydrophobic substances, ultrasonic treatment for 10 to 120 minutes is desirable. For example, 100 mg of a chitin derivative, 45 g of water, and 5 g of 5% β-carotene oil are mixed by stirring and are sonicated for 1 hour. The resulted emulsion is centrifuged to remove the oil layer and the precipitate and the aqueous layer is obtained. Thus a micelle-like aqueous composition is obtained in which β-carotene oil is dispersed uniformly. β-Carotene in the aqueous layer is quantified by determination of the b value (direction of yellowish color) with a color-difference meter.

The micelle-like compositions can be used both an aqueous composition and a dried composition, and the dried composition is more desirable because the hydrophobic substance remains more stable in this state. Dried compositions can be obtained by drying an aqueous composition. The methods of drying the compositions are not limited, and exemplified by lyophilizing, spray drying, and drying under reduced pressure.

BEST MODE FOR CARRYING OUT THE INVENTION

Figure 1:
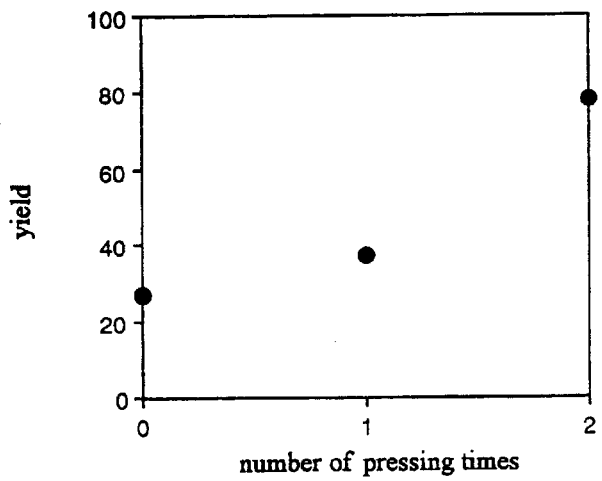
FIG. 1 illustrates the effect of pressing of alkaline chitin in carboxymethylation.

This invention is explained in the Examples. Each Example is a mode for carrying out the invention and does not limit the invention at all.

EXAMPLE 1

To 2 g of pulverized chitin (derived from squid pen, *Todarodes pacificus*) were added 8 ml of 55% sodium hydroxide and 200 μl of 8% sodium dodecylsulfate, and the mixture was stirred at 4° C. for 2 hours, to give alkaline chitin. The mixture was kept in a freezer at −20° C. for 8 hours and the frozen-alkaline chitin was melted at 4° C. This freezing and thawing procedure was repeated. Monochloroacetic acid was added to the slurry of alkaline chitin dispersed in 30 ml of 2-propanol in portionwise with vigorous stirring until the mixture was neutralized, to give crude carboxymethyl chitin.

Carboxymethyl chitin was purified by washing with methanol, dialysis, and filtration. Then purified carboxymethyl chitin was added to the solution mixture of 40 ml of 45% sodium hydroxide and 40 ml of 2-propanol, followed by reflux at 110° C. for 1 hour. After removal of 2-propanol and then dialysis, the resulted purified carboxymethyl chitosan was dissolved in 40 ml of water and 40 ml of methanol was added to carboxymethyl chitosan solution. The mixture was stirred with 4 g of laurylaldehyde for 30 minutes, and then 1.3 g of sodium borohydride was added to the mixture with continuous stirring. The reaction mixture was stirred for 8 hours at room temperature. The precipitate obtained by addition of acetone was washed with methanol, hexane, etc., followed by dialysis and freeze-drying, to give laurylated carboxymethyl chitin (0.75 g).

The physical properties of the laurylated carboxymethyl chitin are listed in Table 1.

TABLE 1

| Molecular weight* | degree of laurylation (%) | degree of carboxymethylation (%) | degree of deacetylation (%) |
|---|---|---|---|
| 50000 | 90 | 140 | 100 |

*Molecular weight: molecular weight of carboxymethyl chitin

The physical properties (molecular weight, degree of deacetylation, degree of carboxymethylation, degree of laurylation) were determined by the following methods.

Molecular weight of carboxymethyl chitin was determined by the method of Inoue et al. (Inoue, Y., Kaneko, M. and Tokura, S.: Rep. Progr. Polym. Phys. Jap., 25, 759 (1982)). Degree of deacetylation, degree of carboxymethylation, and degree of laurylation were determined from the data of analyses of chitin and its derivatives with the elementary analyzer (2400CHN elementary analyzer, Perkin-Elmer Co.) and $^1$H-NMR (ADVANCE DPX400, BRUKER Co.).

EXAMPLE 2

Carboxymethyl chitin (4 g) obtained in Example 1 was stirred in concentrated hydrochloric acid (100 ml) at room temperature for 1 hour. On neutralization, carboxymethyl chitin with reduced molecular weight was obtained as precipitates. The precipitates as the starting material were treated in the same manner as described in Example 1, to give laurylated carboxymethyl chitin (0.8 g).

The physical properties of the resultant laurylated carboxymethyl chitin are listed in Table 2. The properties were determined by the same methods as in Example 1.

TABLE 2

| Molecular weight* | degree of laurylation (%) | degree of carboxymethylation (%) | degree of deacetylation (%) |
|---|---|---|---|
| 2300 | 25 | 140 | 100 |

*Molecular weight: molecular weight of carboxymethyl chitin

EXAMPLE 3

Effect of Pressing of Alkaline Chitin in Carboxymethylation

When insufficiently pulverized chitin was to be used, frozen alkaline chitin was thawed while the chitin was hold and pressed (400 kgf/cm$^2$, 30 seconds) between filter papers to remove excessive alkaline solution, and the amount corresponding to the weight loss of 55% aqueous sodium hydroxide solution was added for easier swelling of alkaline chitin. The process was repeated, and the resulted alkaline chitin was subjected to carboxymethylation described in Example 1. The relationship between the pressing times and the yield is shown in FIG. 1. With increase in the times of pressing, the amount of the water-soluble fraction increased. Obtained carboxymethyl chitin was used as the starting material for preparation of laurylated carboxymethyl chitin by the procedure described in Example 1 (degree of carboxymethylation, 99%; degree of deacetylation, 83%; degree of laurylation, 41%).

EXAMPLE 4

Preparation from Crab Chitin

In place of pulverized squid pen chitin in Example 1, purified crab chitin (Kyowa Technos Co, LTD.: reduced molecular weight chitin passable through 100 mesh-sieve, molecular weight of 50000) was used as the starting material for preparation of laurylated carboxymethyl chitin by the procedure described in Example 1 (degree of carboxymethylation, 111%; degree of deacetylation, 92%; degree of laurylation, 64%).

EXAMPLE 5

Preparation from Chitosan

Ten grams of chitosan (Kyowa Tecnos Co, LTD.: Flonac C-100M, degree of deacetylation: 75.5%) was dissolved in 150 ml of water and a small amount of acetic acid. The solution was stirred with 150 ml of methanol at room temperature for 1 hour, and then stirred with 30 g of laurylaldehyde at room temperature for further 1 hour. Sodium borohydride aqueous solution (10 g/10 ml) was added dropwise, and stirred overnight at room temperature. Methanol was added to the reaction mixture to precipitate the product, then precipitation was washed with methanol, aqueous methanol, hexane, and acetone in this order. The washed product was dried in vacuo, to give 16.8 g of laurylated chitosan (degree of laurylation, 58.2%).

Ten grams of laurylated chitosan was stirred with 110 g of 55% aqueous sodium hydroxide solution and 3 ml of 8% aqueous sodium dodecylsulfate solution at 0° C. for 1.5 hours, frozen at −20° C., and thawed at room temperature. The process of freezing at −20° C. and thawing at room temperature was repeated. After the addition of 100 ml of 2-propanol, monochloroacetic acid was added with stirring until the point of neutralization. Methanol was added to the reaction mixture to precipitate the product, then precipitation was washed with methanol, aqueous methanol, hexane, and acetone in this order. After dialysis and drying, to give 10 g of laurylated carboxymethyl chitin (degree of carboxymethylation, 158.3%).

EXAMPLE 6

Preparation of Myristylated Carboxymethyl Chitin (Alkyl Chain Length: 14)

In the same manner as in Example 1 except that myristylaldehyde was used in place of laurylaldehyde, myristylated carboxymethyl chitin was prepared (degree of myristylation, 22.6%).

EXAMPLE 7

Preparation of Decylated Carboxymethyl Chitin (Alkyl Chain Length: 10)

In the same manner as in Example 1 except that decylaldehyde was used in place of laurylaldehyde in Example 1, decylated carboxymethyl chitin was prepared (degree of decylation, 29.7%).

EXAMPLE 8

Preparation of Octylated Carboxymethyl Chitin (Alkyl Chain Length: 10)

In the same manner as in Example 1 except that octylaldehyde was used in place of laurylaldehyde in Example 1, octylated carboxymethyl chitin was prepared (degree of octylation, 36.2%).

EXAMPLE 9

Preparation of Hexylated Carboxymethyl Chitin (Alkyl Chain Length: 6)

In the same manner as in Example 1 except that hexylaldehyde was used in place of laurylaldehyde in Example 1, hexylated carboxymethyl chitin was prepared (degree of hexylation, 32.7%).

EXAMPLE 10

<Solubilization test>

Method of Solubilization of β-carotene Oil

A mixture of 100 mg of a chitin derivative, 45 g of distilled water, and 5 g of 0.5% β-carotene oil was sonicated (manufactured by nissei, NS-605, 28 kHz) for 1 hour. The resultant emulsion was kept still and centrifuged (3,000 rpm, 20 min), to give the aqueous layer after removal of the oil layer and the precipitation. The product without the chitin derivatives was used as the control.

Method of Quantification of β-carotene in the Aqueous Layer

β-Carotene in the aqueous layer was quantified by measurement of the b value (direction of yellowish color). The b value was measured with the color difference meter (MINOLTA, CR-200, cell ϕ:29 mm, sample amount: 4 g).

Solubilization Test 1

Purpose: to know the difference among the starting materials and the necessity of each substituent. The results are summarized in Table 3.

TABLE 3

| Chitin derivative | Degree of laurylation (%) | Degree of carboxy-methylation (%) | Degree of deacetylation (%) | Starting material |
|---|---|---|---|---|
| Run 1 | carboxymethyl chitin | 0 | 118 | 39 | squid pen chitin |
| Run 2 | carboxymethyl chitosan | 0 | 118 | 99 | squid pen chitin |
| Run 3 | chitosan | 0 | 0 | 76 | crab chitosan |
| Run 4 | laurylated chitosan | 58 | 0 | 76 | crab chitosan |
| Run 5 | laurylated carboxymethyl chitin | 73 | 118 | 99 | squid pen chitin |
| Run 6 | laurylated carboxymethyl chitin | 64 | 111 | 92 | crab chitin |

| | | b value |
|---|---|---|
| | control | −1.99 |
| Run 1 | carboxymethyl chitin | 0.05 |
| Run 2 | carboxymethyl chitosan | 0.82 |
| Run 3 | chitosan | 10.40 |
| Run 4 | laurylated chitosan | 1.12 |
| Run 5 | laurylated carboxymethyl chitin | 32.79 |
| Run 6 | laurylated carboxymethyl chitin | 18.72 |

The results of Run 1, 2, 4, and 5 revealed that both the hydrophobic group (lauryl group) and the hydrophilic group (carboxymethyl group) are necessary. Solubilizing ability is not different between squid-derived products and crab-derived products.

Figure 2:
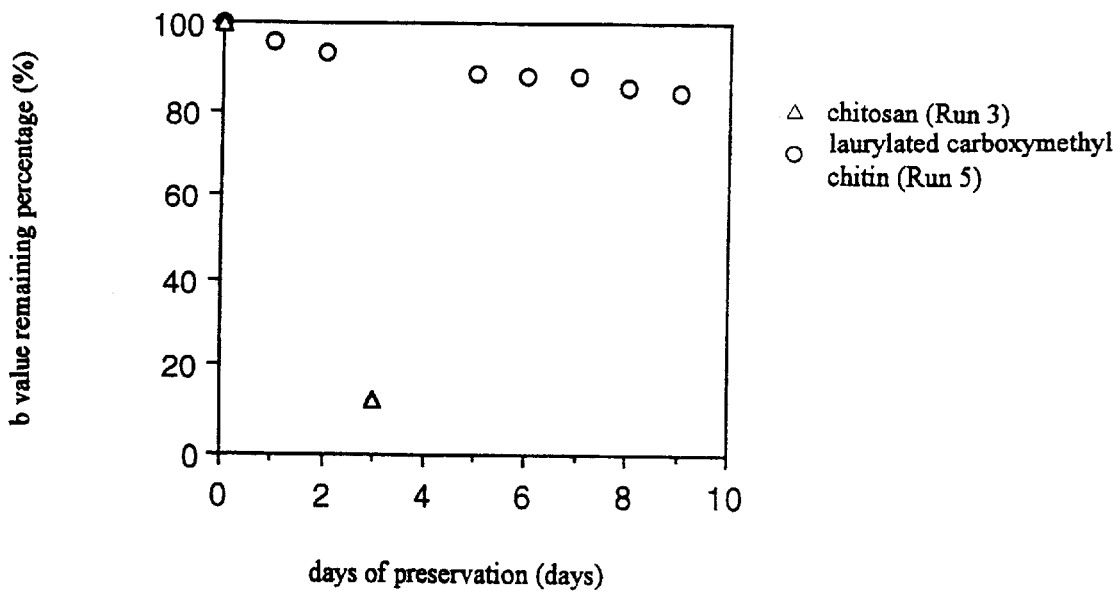
FIG. 2 shows the results of preservation test of the micelle-like aqueous compositions prepared with chitosan and laurylated carboxymethyl chitin. The micelle-like aqueous compositions were kept in transparent bottles under natural light at room temperature.

To clarify the difference between laurylated carboxymethyl chitin and chitosan, the preservation test was performed by keeping the samples (Run 3 and Run 5) in transparent bottles under natural light at room temperature. The results are summarized in FIG. 2. Even chitosan was solubilized β-carotene in the aqueous layer but the micelle comprised of chitosan was not stable as it almost completely lost its color in 3 days. However the micelle comprised of laurylated carboxymethyl chitin was stable as it hardly lost its color.

Solubilization Test 2

Figure 3:
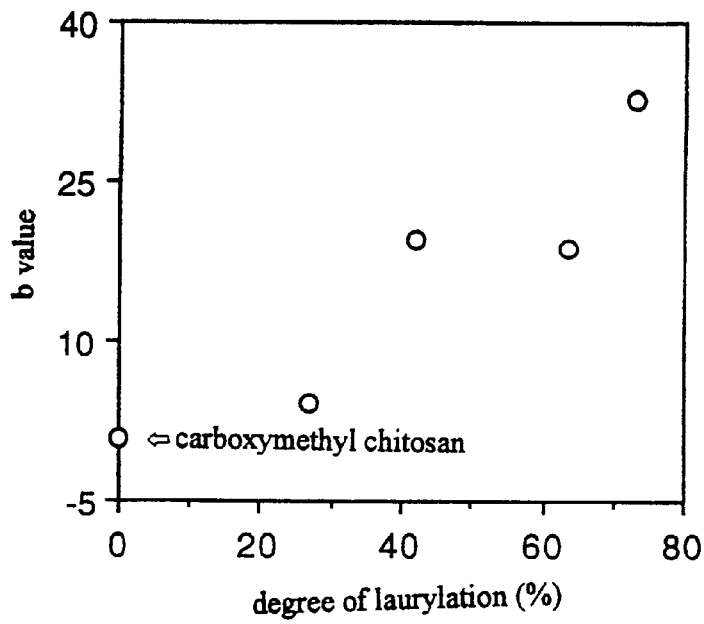
FIG. 3 illustrates the relationship between the degree of substitution with lauryl group and the solubilizing ability.

Purpose: to investigate the relation between degree of substitution with the lauryl group and solubilizing ability of β-carotene. The results are summarized in FIG. 3. It was shown that the higher the degree of substitution with the lauryl group (having 12 carbon atoms), the higher the solubilizing ability.

Solubilization Test 3

Figure 4:
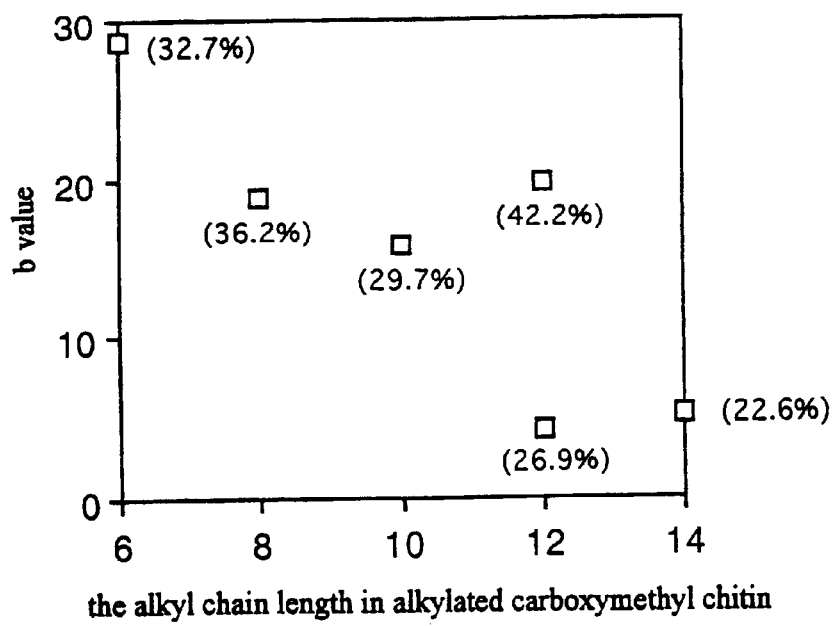
FIG. 4 illustrates the effect of the alkyl chain length in an alkylated carboxymethyl chitin derivative on solubilization.

Purpose: to investigate the effect of the alkyl chain length of the alkylated carboxymethyl chitin derivative on solubilization. The results are summarized in FIG. 4. When the degree of substitution was almost the same, the smaller the alkyl chain length, the higher the solubilizing ability. It may be due to the difference of the solubility of chitin derivatives for water. Indeed it was confirmed that only the derivative having an alkyl chain of 6 carbon atoms was soluble in water. This property is useful for utilization of the derivative as a moisturizer, etc.

Method of Determination of Particle Size Distribution

The particle size distribution was determined with Shimazu centrifugal particle size analyzer SA-CP3 in the centrifugal floating mode at 1.4 of particle density, 0.997 of solute density, 0.916 of solute viscosity, and at room temperature.

The measurements of mean particle size are listed in Table 4.

TABLE 4

| | | | Alkylated carboxymethyl chitin derivative Number of carbon atoms of the alkyl group | | | | |
|---|---|---|---|---|---|---|---|
| Sample | Control | Chitosan | 6 | 3 | 10 | 12 | 14 |
| Mean particle size | 630 nm | 510 nm | 290 nm | 230 nm | 180 nm | 260 nm | 380 nm |

With the present method of preparation, the particle size of alkylated carboxymethyl chitin was smaller than that of the control.

Freeze-drying Resistance Test

A part of the aqueous layer was freeze-dried and reconstituted in the same volume of water for evaluation of the resistance.

The alkylated carboxymethyl chitin derivatives having alkyl groups of 6 or 12 carbon atoms were examined for the resistance of micelles to freeze-drying: the derivative having an alkyl group of 6 carbon atoms was well dispersed on reconstitution, showing the b value after reconstituted comparable to that of the solution before freeze-drying (b value remaining percentage: 93.3%). However the derivative having an alkyl group of 12 carbon atoms was poorly dispersed on reconstitution so that a part of oil was separated and the b value remaining percentage was as low as 32.5%.

Retort Resistance Test

Alkylated carboxymethyl chitin derivatives having alkyl groups of 6 or 12 carbon atoms were autoclaved in retort pouches at 121° C. for 10 minutes for evaluation of the resistance.

The b value remaining percentage of the aqueous layer was 79.6% and 97.3% for the derivative having an alkyl group of 6 carbon atoms and for the derivative having an alkyl group of 12 carbon atoms, respectively; thus the derivatives were shown to be resistant to retort.

INDUSTRIAL APPLICABILITY

This invention is able to provide chitin derivatives having carboxyalkyl groups as the hydrophilic substituents and alkyl groups as hydrophobic substituents useful for production of soil-improving agents, protein aggregating agents, micelle-forming agents, etc. This invention is able to provide polymer micellar carriers comprised of the chitin derivatives and micelle-like aqueous compositions of insoluble perfumes, insoluble pigments, or fats and oils by using the chitin derivatives.

What is claimed is:

1. A chitin derivative having a carboxyalkyl group having a polysaccharide backbone, said carboxyalkyl group being represented by the following formula (1):

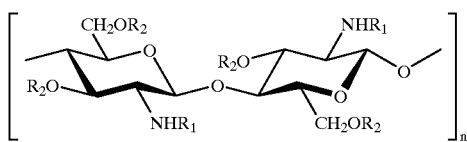

(1)

wherein n=1 or above, $R_1$ stands for an alkyl group represented by $(CH_2)_pCH_3$ with p=1 to 20, an alkylcarbonyl group represented by $CO(CH_2)_qCH_3$ with q=1 to 19, a carboxyalkyl group represented by $(CH_2)_rCOOH$ with r=1 to 5 or a salt thereof, H, or $COCH_3$, and $R_2$ stands for a carboxyalkyl group represented by $(CH_2)_sCOOH$ with s=1 to 5 or a salt thereof or H; the degree of deacetylation of the N-acetyl group in chitin is 70 to 100%, wherein 100% deacetylation means one deacetylated N-acetyl group per one monosaccharide unit; 10 to 100% of $R_1$ are selected from alkyl groups $(CH_2)_pCH_3$ and alkylcarbonyl groups $CO(CH_2)_qCH_3$, wherein 100% means one alkyl group $(CH_2)_pCH_3$ or alkylcarbonyl group $CO(CH_2)_qCH_3$ per one monosaccharide unit; not more than 10% of $R_1$ are carboxyalkyl groups $(CH_2)_rCOOH$; 50 to 200% of $R_2$ are carboxyalkyl groups $(CH_2)_sCOOH$, wherein 200% means two carboxyalkyl groups $(CH_2)_sCOOH$ per one monosaccharide unit; and the molecular weight of the polysaccharide backbone is 150,000 or less.

2. The chitin derivative of claim 1, wherein the molecular weight of the unsubstituted chitin in the formula (1) is 100,000 or less.

3. A micelle-containing aqueous composition which comprises the chitin derivative of claim 1, used as a polymer micellar carrier, and a hydrophobic compound which is included within polymer micelles formed in the aqueous solution which comprises said polymer micellar carrier.

4. The micelle-containing aqueous composition of claim 3, wherein the hydrophobic compound is an insoluble perfume, an insoluble pigment, or a fat and an oil.

* * * * *